J. C. GEBHART.
MACHINE FOR MEASURING TEXTILE FABRIC AND COMPUTING THE PRICE THEREOF.
APPLICATION FILED APR. 27, 1917.

1,252,340.

Patented Jan. 1, 1918.
6 SHEETS—SHEET 1.

Witnesses
G. D. Kesler
John Powers

Inventor:
John C. Gebhart
by
James L. Norris,
Attorney

J. C. GEBHART.
MACHINE FOR MEASURING TEXTILE FABRIC AND COMPUTING THE PRICE THEREOF.
APPLICATION FILED APR. 27, 1917.
1,252,340.
Patented Jan. 1, 1918.
6 SHEETS—SHEET 2.
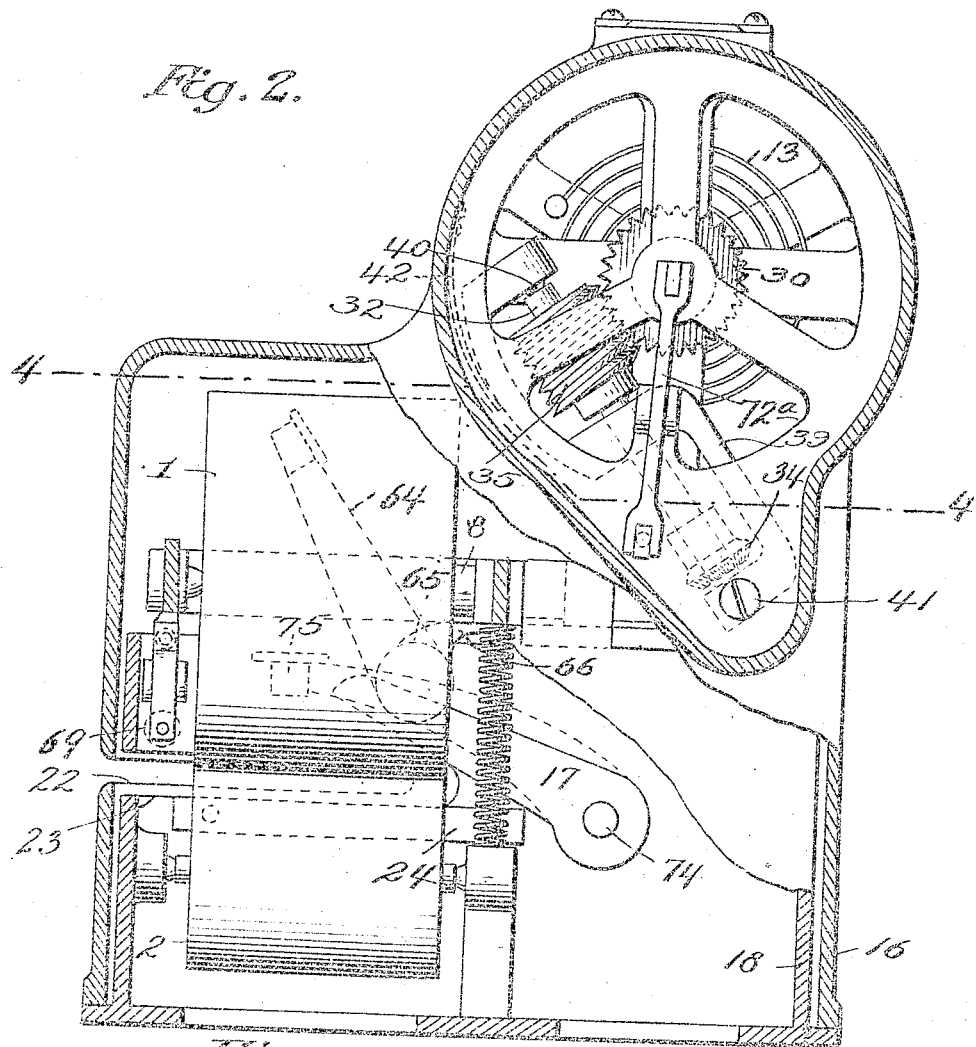
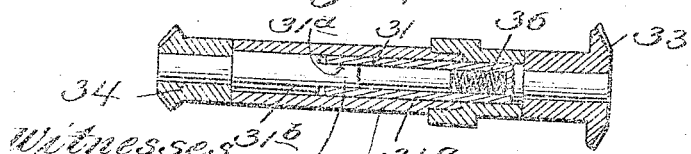
Witnesses
G. F. Kesler
John Powers
Inventor:
John C. Gebhart
by
Ernest L. Norris,
Attorney

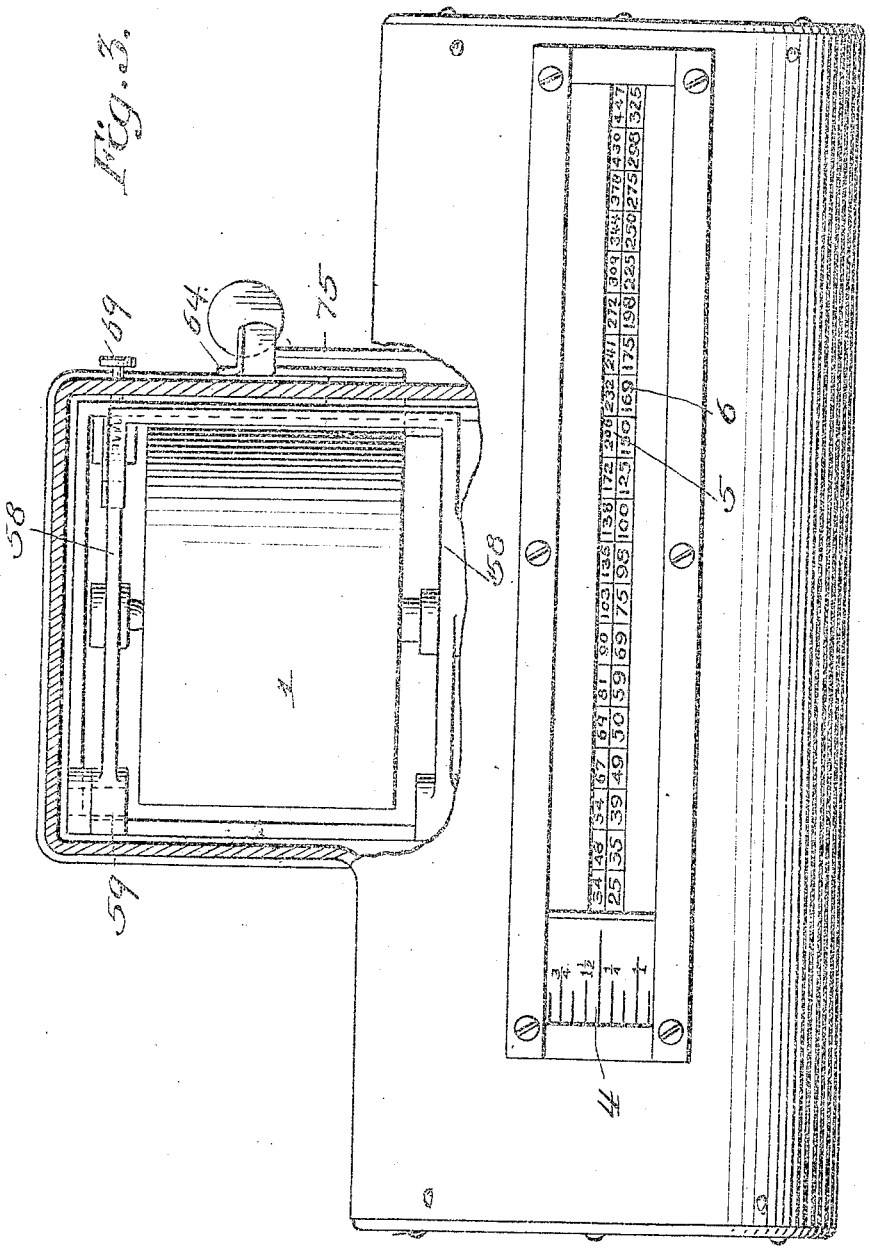

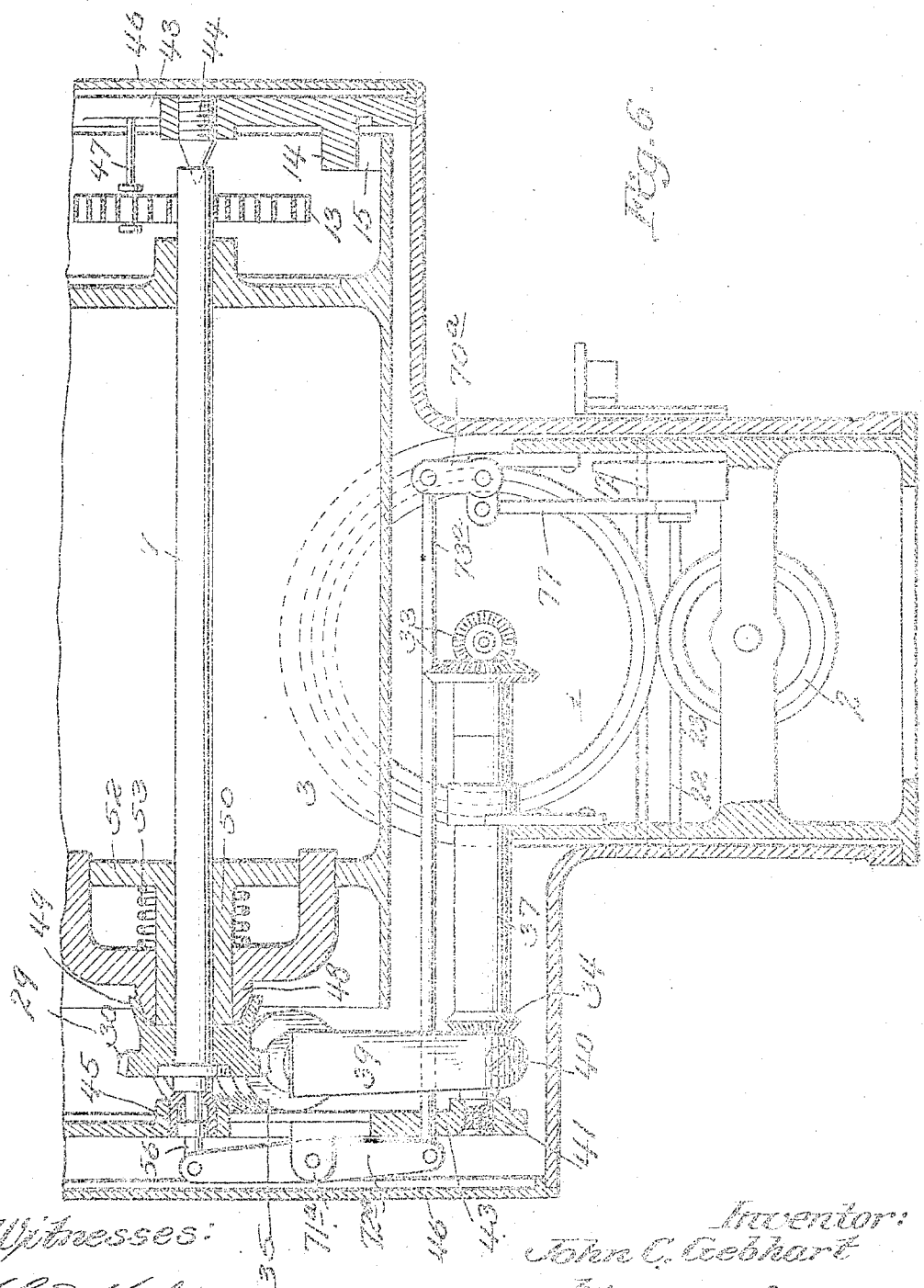

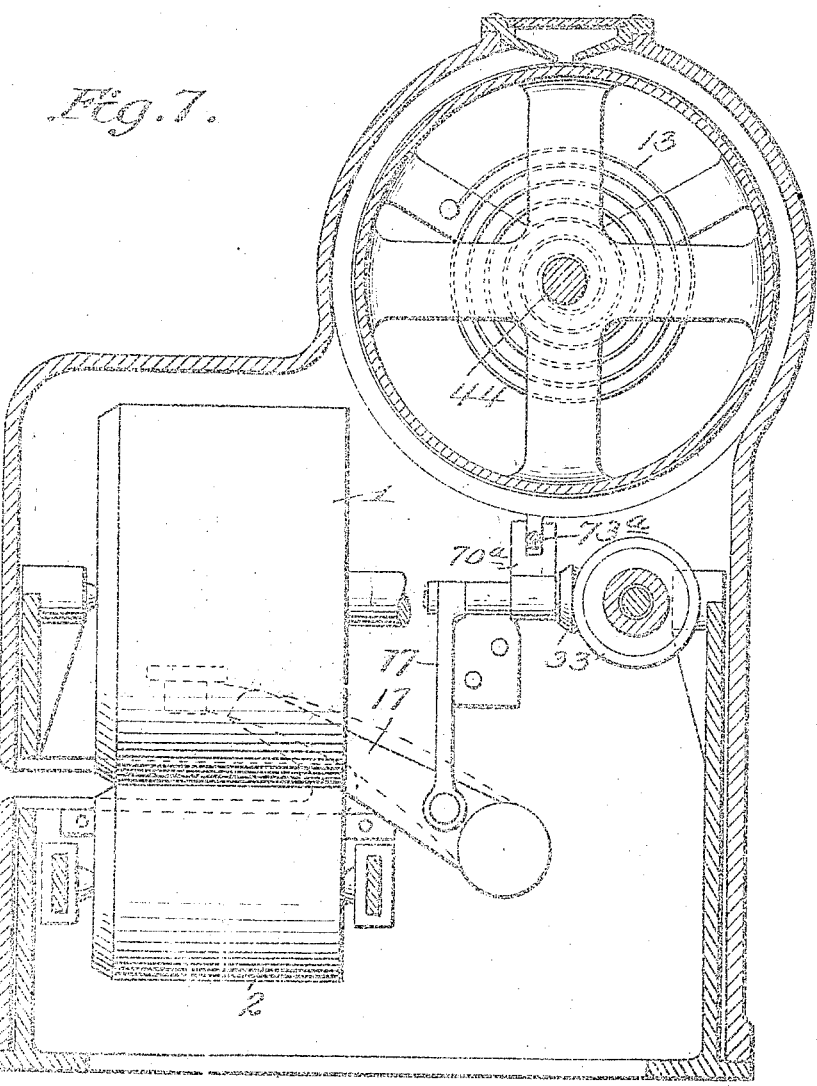

UNITED STATES PATENT OFFICE.

JOHN C. GEBHART, OF ST. LOUIS, MISSOURI, ASSIGNOR, BY MESNE ASSIGNMENTS, TO ECONOMETER COMPANY, OF ST. LOUIS, MISSOURI, A CORPORATION OF MISSOURI.

MACHINE FOR MEASURING TEXTILE FABRIC AND COMPUTING THE PRICE THEREOF.

1,252,340.  Specification of Letters Patent.  Patented Jan. 1, 1918.

Application filed April 27, 1917. Serial No. 165,020.

*To all whom it may concern:*

Be it known that I, JOHN C. GEBHART, a citizen of the United States, residing at St. Louis, in the county of St. Louis City and State of Missouri, have invented new and useful Improvements in Machines for Measuring Textile Fabric and Computing the Price Thereof, of which the following is a specification.

This invention relates to an improved machine for measuring textile fabric and computing the price thereof. The invention proposes a machine of the type wherein the measuring and price computing operations are due to the movement of the cloth between rollers.

The principal object of the invention is to provide a machine of the character described having means of novel and efficient character for automatically effecting the zero-setting of the movable element of the length measuring and price computing means in connection with a manual operation necessary upon the completion of the operation of the machine, thereby to reduce the number of manual operations required with the resultant advantages of facilitating use and reducing liability of error.

A further object of the invention is to provide certain novel and advantageous features of construction and organization in a machine of the specific type disclosed in my pending application Serial No. 84,899.

The invention is illustrated in the accompanying drawings, wherein:—

Fig. 2 is a vertical sectional view on the line 2—2 of Fig. 1;

Fig. 3 is a plan view thereof, partly broken away and in section;

Fig. 5 is a detail sectional view showing certain gear elements which operatively connect the power roller and the drum which carries the price value chart and length indicating scale;

Fig. 6 is a view similar to Fig. 1 of a slightly modified construction;

Fig. 7 is a vertical sectional view of the construction shown in Fig. 6.

Similar characters of reference designate corresponding parts throughout the several views.

Figure 1:
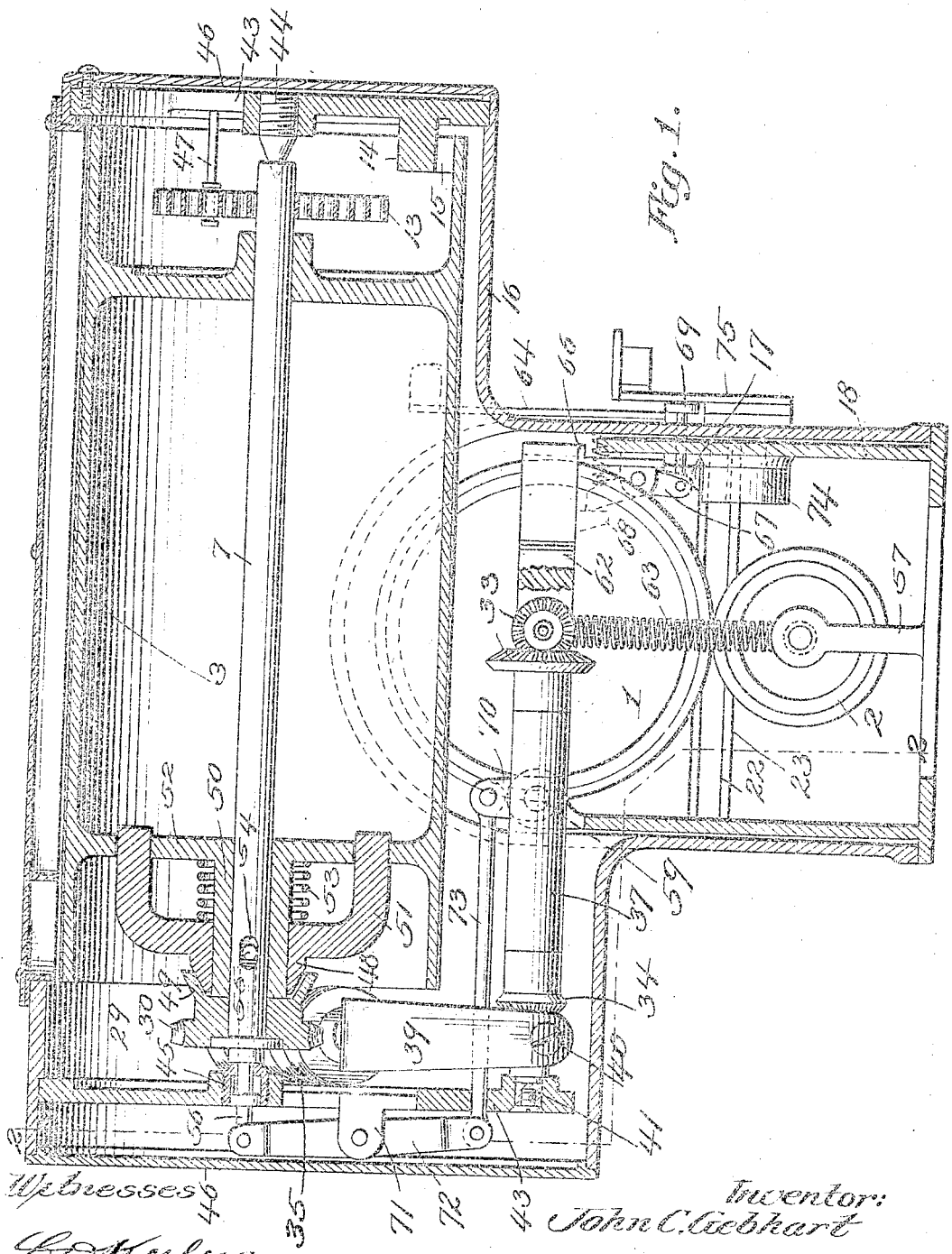
Figure 1 is a vertical cross-sectional view of a machine in which the features of the invention are incorporated.
Figure 4:
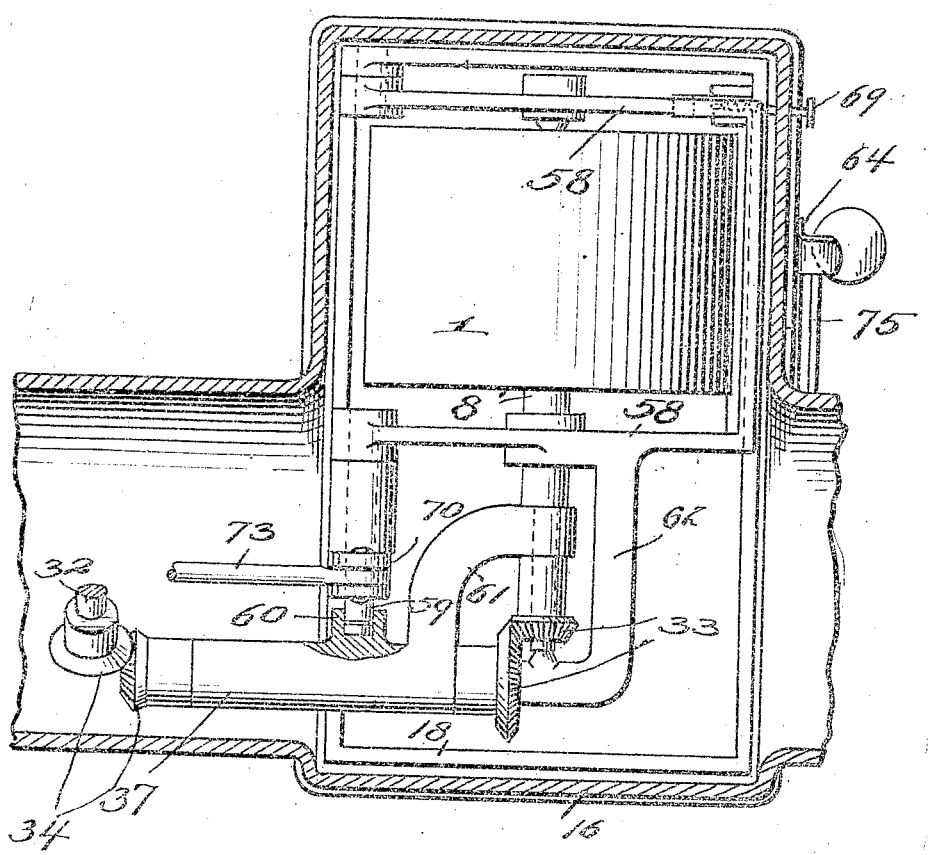
Fig. 4 is a detail sectional view on the line 4—4 of Fig. 2.

Referring to Figs. 1–5: The machine disclosed is, as to its principal parts, generally similar in structure, organization and mode of operation to the machine disclosed in my pending application Serial No. 150,113. Thus, the fabric to be measured is drawn between upper and lower rollers 1 and 2, the upper roller serving as a power roller for the operation of the drum 3 which carries the length indicating scale 4 and the price value chart 5, the latter co-acting with a scale 6 for indicating price per yard. The drum 3 is mounted on a shaft 7 which is located above and extends at a right angle to the shaft 8 upon which the roller 1 is mounted. The shaft 8 is geared to the shaft 7 whose operation is controlled by a suitable clutch. Upon the completion of the operation of the machine, the said clutch is operated to free the shaft 7 and the drum 3 is thereupon restored to its initial position or zero-set by a coil spring 13, the zero-setting movement of said drum being limited by the engagement of a lug 15 provided at one end thereof with a fixed stop lug 14. When the required length of fabric has been measured, the edge or margin of the fabric is cut by a knife 17, the slit thus made showing the line along which the measured fabric is to be cut or turned.

The operating parts are inclosed in a suitable casing 16 having a slot 22 in its side and front walls which registers with a slot 23 in the side and front walls of an inner casing 18 and through which the fabric is moved during the operation of the machine. The casing 18 furnishes support for the rollers 1 and 2; and the knife 17 preferably works within said casing 18 and co-acts with a stationary blade 24 secured to a side wall of said casing just below the slot 22, said knife being mounted on a rock shaft 74 journaled in the casings 16 and 18 and provided with an external spring-held operating lever 75.

The power for the operation of the drum 3 is applied at one end thereof. The relation of the drum 3 and the casing 16 is such that a clearance 29 is provided at one end of said drum in which is arranged a worm wheel 30 mounted on the shaft 7. The worm wheel 30 forms the last element of the gearing between the shafts 8 and 7; and the said gearing further includes shafts 31 (Fig. 5) and 32, the shaft 31 being driven by miter gears 33 from the shaft 8 and by miter gears 34 driving the shaft 32 (Fig. 2) which carries a worm 35 in mesh with the worm wheel 30. The shaft 31 (Fig. 5) is of sectional construction and includes telescoping slidably related parts 31$^a$ and 31$^b$, the latter fitting within the former and having key lugs 31$^c$ for which the section 31$^a$ is provided with slots 31$^d$. The bore of the section 31$^a$ incloses a spring 36 which tends to move the sections 31$^a$ and 31$^b$ outward and thereby compensates for wear of the miter gears 33 and 34. The sections 31$^a$ and 31$^b$ have their bearing in a sleeve 37. The shaft 32 is carried by a bracket 39 whose ends are equipped with cone bearings 40 for said shaft. The cone bearing 40 adjacent the miter gearing 34 has an opening through it whereby it may be fitted pivotally upon a fixed post 41 about which the bracket 39 may swing. Said bracket at its free end is acted upon by a spring 42 which insures the efficient engagement of the worm 35 and worm wheel 30 and thus compensates for wear or the defective fitting of these elements.

That portion of the casing which incloses the drum 3 is provided with end spider frames 43 which carry cone bearings 44 and 45 for the shaft 7. It is preferred to provide end closure plates 46 at the outer sides of the spider frames 43. The spider frame 43 which adjoins the spring 13 carries a pin 47 to which the outer end of the spring 13 is secured and also carries the stop lug 14 previously mentioned. The spider frame 43 at the opposite end of the machine carries the post 41 upon which the bracket 39 is pivoted as above described.

The clutch by which the operation of the drum 3 is controlled comprises a movable member 48 and a fixed member 49, the latter being carried by or formed with the worm wheel 30. The member 48 is slidably mounted on a hub 50 of the drum 3 and is provided with inwardly directed guide and coupling arms 51 which have a close sliding fit in openings formed in the spokes 52 which connect the hub 50 and the frame. The member 48 is moved toward the member 49 by a spring 53 which surrounds the hub 50 and bears against the member 48 and the spokes 52. The hub 50 and the shaft 7 are formed with registering longitudinal slots 54 and the clutch member 48 carries a transverse pin 55 which projects through said slots. For the purpose of disengaging the clutch elements 48 and 49, a stem 56 is provided, said stem having a sliding fit in the bores of the shaft 7 and of the cone bearing 45 and engaging the pin 55 with its free end.

The worm wheel 30 is loose on the shaft 7 and operates the drum 3 by virtue of the arrangement of the arms 51 in the openings in the spokes 52 and of the arrangement of the pin 55 in the slots 54. When the clutch member 48 is disengaged from the clutch member 49 by the inward movement of the stem 56, the spring 13, which has been tensioned during the rotation of the drum, acts on the shaft 7 to restore the drum to its initial position, the pin 55 transmitting the rotation of said shaft to said drum.

The construction as above described is similar to that shown in my said pending application Serial No. 150,113.

The machine disclosed in Figs. 1, 2, 3 and 5 differs, however, from the machine of my said co-pending application in that the support for the upper roller 1 is movably mounted and the support for the lower roller is stationary. The lower roller 2 is supported at its ends by standards 57 formed with or secured to the casing 18. The shaft 8 of the roller 1 is supported in the frame 58 whose side bars are pivoted, as at 59, to supporting lugs or ears carried by the casing 18, the pivots 59 being located at the side of the roller 1 opposite that which is adjoined by the knife 17. The sleeve 37 which provides a bearing for the shaft 31 is supported from the frame 58 in such manner that it participates in the movement of said frame about the pivots 59. For this purpose, said sleeve has a recessed boss or lug 60 (Fig. 4) closely fitting over an extension of one of the pivots 59 and also an arm 61 terminating in a sleeve which closely surrounds the shaft 8. The frame 58 is preferably provided with an arm 62 against which the gears 33 are stepped. The frame 58 normally occupies a horizontal plane and is held in such position by helical springs 63 which connect its side bars with the standards 57. The action of the springs 63 is to hold the roller 1 in strong contact with the roller 2 and thereby insure the application by the fabric of driving power to the roller 1.

In order to permit the removal of the fabric when the operation of the machine has been completed, the frame 58 is raised against the tension of the springs 63; and for the purpose of raising said frame, it is preferred to employ the mechanism shown which comprises a lever 64 arranged externally of the casing 16 and mounted on a post 65 (Fig. 2) which is journaled in the casings 16 and 18, said post having within the casing 18 a finger 66 arranged to engage the under face of the end bar of the frame 58. By depressing the lever 64, the finger 66 is actuated to raise the frame 58 about its pivot 59, as is obvious.

In order to hold the frame 58 in its elevated position and thereby to maintain the spacing of the rollers 1 and 2, a latch lever 67 is arranged to engage under a lug 68 carried by said frame. The said latch lever is provided with a laterally projecting pin 69 having an external head, and by means of which said lever may be actuated to disengage the lug 68 and thereby permit the downward movement of the frame 58 and the consequent contact of the rollers 1 and 2.

To effect the automatic operation of the clutch, one of the pivots 59 is actuated as a rock shaft by the frame 58 and is provided with an upright lever 70. The spider 43 which adjoins the worm wheel 49 is provided with an outwardly projecting lug 71 to which is pivoted a two-armed lever 72 whose lower arm is connected by a link 73 to the lever 70 and whose upper arm is somewhat loosely pivoted to an extension of the stem 56. It will be apparent that when the frame 58 is raised by the actuation of the lever 64 in the manner described, the train of parts 70, 73 and 72 will effect an inward movement of the stem 56 and a consequent disengagement of the clutch element 48 from the clutch element 49. Thereupon, the spring 13 operates the drum 3 to effect the zero-setting of the scale 4 and chart 5. On the other hand, when the pin 69 is actuated to provide for the lowering of the frame 58 and the consequent contact of the rollers 1 and 2, the same train of parts 70, 73 and 72 operates the stem 56 to permit the engagement of the clutch element 48 with the clutch element 49 whereby the drum 3 will be driven from the roller 1.

The modified construction shown in Figs. 6 and 7 follows the construction shown in my said pending application, Serial No. 150,113 in the respects noted. Both of the rollers 1 and 2 are, however, mounted in fixed bearings and have their outer edges chamfered to facilitate the introduction between them, and the removal of the fabric. The disengagement of the clutch element 48 from the clutch element 49 is effected in connection with the operation of the knife 17, the means employed being substantially similar to that of the first construction. Thus, a bell crank lever 70ᵃ is pivoted to a bracket secured to a side wall of the casing 18; and the vertical arm of said lever is connected by a link 73ᵃ to the lower end of a two-armed lever 72ᵃ mounted on a supporting lug 71ᵃ and having its upper end loosely pivoted to the pin 56. The horizontal arm of the lever 70ᵃ is connected by a link 77 to the knife 17 which when operated to slit the fabric effects the disengagement of the clutch elements through the connections described, as will be obvious.

I claim as my invention—

1. In a machine of the class described, in combination, length measuring and price computing means including a chart and a part co-acting with the chart to indicate length and price thereon, said chart and part being relatively movable companion elements, a pair of rollers, gearing between one of said rollers and the movable element of said means, including a clutch having relatively movable elements, means for resetting the movable element of said means when the clutch elements are disengaged, a slidable stem operative to effect the disengagement of said clutch elements, an externally accessible lever and means operatively connecting said lever and said stem comprising a two-armed lever pivoted at its upper end to said stem, a third lever operated by said externally accessible lever and a link connecting said third lever and the lower end of said two-armed lever.

2. In a machine of the class described, in combination, upper and lower rollers, a drum located at one side and transversely of said rollers, gearing between one of said rollers and said drum for operating the latter and including a clutch co-axial with said drum, means for resetting said drum when the elements of said clutch are disengaged, and means for disengaging the elements of said clutch including a slidable stem acting on one of said elements, a two-armed lever mounted adjacent said stem and having its upper end pivoted to said stem, an externally accessible lever and means operatively connecting said externally accessible lever and the lower end of said two-armed lever.

3. In a machine of the class described, in combination, length measuring and price computing means including a chart and a part co-acting with the chart to indicate length and price thereon, said chart and part being relatively movable companion elements, a pair of rollers, gearing between one of said rollers and the movable element of said means including a clutch having relatively movable elements, means for resetting the movable element of said means when the clutch elements are disengaged, and means for disengaging the elements of said clutch including a slidable stem acting on one of said clutch elements, a two-armed lever mounted adjacent said stem and having its upper end pivoted to said stem, an externally accessible lever, and means operatively connecting said externally accessible lever and the lower end of said two-armed lever.

4. In a machine of the class described, in combination, upper and lower rollers, a drum located at one side and transversely of said rollers, gearing between one of said rollers and said drum for operating the latter and including a clutch co-axial with said drum, means for resetting said drum when the elements of said clutch are disengaged, and means for disengaging the elements of said clutch including a slidable stem acting on one of said elements, a two-armed lever mounted adjacent said stem and having its upper end pivoted to said stem, an externally accessible lever, a third lever, means of connection between said externally accessible lever and said third lever for the operation of the latter, and a link connecting said third lever and the lower end of said two-armed lever.

5. In a machine of the class described, in combination, upper and lower rollers, a movable support for the upper roller operable to effect its disengagement from the lower roller, a drum located at one side and transversely of said rollers, gearing between one of said rollers and said drum for operating the latter and including a clutch co-axial with said drum, means for resetting said drum when the elements of said clutch are disengaged, and means for disengaging the elements of said clutch including a slidable stem acting on one of said elements, a two-armed lever mounted adjacent said stem and having its upper end pivoted to said stem, a second lever, means for operating the second lever by the movement of the support for the upper roller, and a link connecting said second lever and the lower end of said two-armed lever.

In testimony whereof I have hereunto set my hand in presence of two subscribing witnesses.

JOHN C. GEBHART.

Witnesses:
 E. D. PINKERTON,
 WM. E. GARVIN.